United States Patent [19]

Goldsmith

[11] Patent Number: 4,781,831
[45] Date of Patent: Nov. 1, 1988

[54] CROSS-FLOW FILTRATION DEVICE WITH FILTRATE FLOW CONDUITS AND METHOD OF FORMING SAME

[76] Inventor: Robert L. Goldsmith, 323 Waverly St., Belmont, Mass. 02178

[21] Appl. No.: 33,572

[22] Filed: Apr. 2, 1987

Related U.S. Application Data

[63] Continuation-in-part of Ser. No. 944,663, Dec. 19, 1986, abandoned.

[51] Int. Cl.[4] ............................................. B01D 13/00
[52] U.S. Cl. ................................. 210/247; 210/321.82; 210/321.89; 210/486
[58] Field of Search .................. 210/433.2, 496, 321.1, 210/652, 247, 321.89, 321.82, 456

[56] References Cited

U.S. PATENT DOCUMENTS

| | | | |
|---|---|---|---|
| 3,712,473 | 1/1973 | Ellenburg | 210/321.1 |
| 4,222,874 | 9/1980 | Connelly | 210/652 X |
| 4,568,456 | 2/1986 | van Zon | 210/321.89 |

*Primary Examiner*—Frank Spear
*Attorney, Agent, or Firm*—Joseph S. Iandiorio; Douglas E. Denninger

[57] ABSTRACT

A cross-flow filtration device which separates a feed stock into filtrate and retentate, including a structure of porous material which defines a plurality of passageways extending longitudinally from the feed end of the structure to a retentate end, and a number of filtrate conduits within the structure for carrying filtrate from within the structure toward a filtrate collection zone. The filtrate conduits provide paths of lower flow resistance than that of alternative flow paths through the porous material, and the structure is constructed such that the filtrate conduits are distributed among the passageways to provide low pressure drop flow paths for filtrate flow from the passageways through the porous material to nearby filtrate conduits. The cross-flow filtration device can also be utilized as a membrane support for a device for cross-flow microfiltration, ultrafiltration, reverse osmosis, gas separations or pervaporation. Also disclosed is a method of making such a cross-flow filtration device.

37 Claims, 6 Drawing Sheets

CROSS-FLOW FILTRATION DEVICE WITH FILTRATE FLOW CONDUITS AND METHOD OF FORMING SAME

RELATED CASES

This application is a continuation-in-part of U.S. Ser. No. 944,663, filed Dec. 19, 1986, "Membrane Device with Permeate Flow Conduits", by Robert L. Goldsmith, now abandoned

FIELD OF INVENTION

This invention relates to an improved cross-flow filtration device for separating a feed stock into filtrate and retentate, and more particularly to such a device having filtrate conduits with low flow resistance which provide enhanced filtrate removal from the interior of the device. This invention also relates to an improved membrane device which employs such a cross-flow filtration device as a membrane support.

BACKGROUND OF INVENTION

There are a multitude of filtration devices which separate a feed stock into filtrate and retained suspended matter which is too large to pass through the pore structure of the filter. A straight-through filter retains the suspended matter on the filter surface or within the filter matrix and passes only the filtrate. Cross-flow filters operate with tangential flow across the filter surface to sweep away suspended matter unable to pass through the filter surface pores. Cross-flow filters provide for the continuous extraction of retentate, or concentrated suspended matter, from one portion of the device and continuous extraction of filtrate from another portion. As is well known in the art, the filtration rate of cross-flow filters is generally limited by the resistance of a filter cake that builds up on the filter surface. The thickness and corresponding resistance of this cake is controlled by the cross-flow velocity. This phenomenon of cake thickness controlled by concentration polarization of retained suspended matter is extensively described in the technical literature. In order to obtain the maximum filtration rate, cross-flow filters are normally constructed from porous materials which have a low resistance to filtrate flow relative to that of the filter cake. That is, in operation the pressure drop across the porous filter itself is low relative to the pressure drop across the filter cake, and the resistance of the latter is determined by hydrodynamic flow conditions across the filter surface.

Cross-flow filters can be constructed using multiple-passageway, porous monoliths. Such monoliths can have tens to thousands of passageways extending through them, with the passageways normally parallel and uniformly spaced. When in use the feed stock is introduced under pressure at one end of the monolith, flows in parallel through the passageways, and is withdrawn as retentate at the downstream end of the device. Filtrate which passes into the porous monolith walls separating the passageways combines and flows through the walls toward the periphery of the monolith, and is removed through an integral, pressure-containing outer skin of the monolith. The resistance to flow in the tortuous flow path of the monolith passageway walls can severely limit filtration capacity, and for this reason cross-flow filters based on high surface area, multiple-passageway, porous monoliths are not found in commercial use.

Membrane devices utilize a semipermeable membrane to separate filtrate, also called permeate, from retentate. There is a multitude of different membrane devices which separate and concentrate particles, colloids, macromolecules, and low molecular weight molecules. Membranes generally require a mechanical support which can be integral with the membrane, as for self-supporting asymmetric membranes, or separate. For the latter, membranes can be coated onto, or simply mechanically supported by, a porous support material.

Multiple-passageway, porous monoliths can be especially useful as membrane supports. In this instance membranes are applied to the passageway walls, which serve both as a mechanical support and as the flow path for filtrate removal to a filtrate collection zone. A high flow resistance of the passageway walls of the monolith can be troublesome first in that it can prevent adequate formation of membranes, for example, by dynamic formation procedures. Second, if membranes are otherwise applied to the monolith passageway walls, the resistance of the passageway walls to filtrate flow can limit device capacity. This limitation has clearly been recognized by developers of such devices, for example, by Hoover and Roberts in U.S. Pat. No. 4,069,157. That patent teaches a solution to such limitation by limiting a number of parameters to values within specific ranges. The surface area of the passageways per unit volume, the porosity of the support, and the proportion of the volume of the support material exclusive of the passageways to the total volume of the support are defined within certain ranges, and are combined to define an allowable range of a permeability factor for the support.

Other monolith-based membrane devices have been developed in the United States, France, and The People's Republic of China. For these devices practitioners also have recognized a support permeability limitation and have generally overcome this limitation by use of monoliths with combinations of small overall diameter, relatively few feed passageways and large pore size of the support material. One commercially-available membrane device utilizes a number of small diameter hexagonal monoliths, each with up to 19 passageways, distributed within a cylindrical housing. Filtrate exits from all six sides of each monolith and mixes with the filtrate from the other monoliths, after which it is collected. The overall packing density, or membrane area per unit volume, of this device is quite low.

The monoliths used by all the above sources as supports for membrane devices have had the common characteristic of employing passageways which are substantially uniformly spaced throughout the support. Given this constraint, product developers have worked with variables such as those detailed by Hoover and Roberts in the above referenced patent to avoid filtrate flow path limitations.

Thus the flow resistance of the passageway walls of porous monoliths can be a limiting factor in the use of monoliths either as cross-flow filtration devices or as membrane supports in membrane devices. Further, this limitation becomes increasingly severe as the packing density, or effective filter or membrane area per unit volume, of the device increases.

In the field of heat exchangers there are several conventional devices having a multiple flow path body. For the device of Kelm, U.S. Pat. No. 4,041,592, for example, two fluids enter separately into a body, are maintained separately within the body, and exit separately. Thermal exchange occurs between the two fluids but there is no transfer of matter. Kelm suggests that a porous body can be utilized for the exchange of matter or the filtering of a fluid between flow paths, but no further teaching is provided.

SUMMARY OF INVENTION

It is therefore an object of this invention to provide an improved cross-flow filtration device which readily removes filtrate from the device.

It is a further object of this invention to provide such a cross-flow filtration device which has a large amount of surface area of its passageways relative to the volume of the device.

It is a further object of this invention to provide such a cross-flow filtration device which effectively utilizes substantially all of its passageways by providing a low pressure drop flow path for filtrate between even the innermost passageways and a filtrate collection zone associated with the device.

It is a further object of this invention to provide such a cross-flow filtration device which enables the walls of the passageways to have smaller pore sizes while still providing adequate filtrate removal rates.

A still further object of this invention is to provide a method of making such a cross-flow filtration device.

Yet another object of this invention is to provide an improved membrane support for use in a membrane device in which membranes are supported on the surfaces of its passageways.

This invention results from the realization that truly effective filtrate removal for a cross-flow filtration device or a membrane device using one or more porous monoliths having multiple passageways can be achieved by constructing a number of discrete conduits distributed among the monolith passageways to effectively carry filtrate from the passageways in the interior of the structure toward a filtrate collection zone, each conduit having a low flow resistance relative to the monolith passageway walls and being separated from the other conduits by relatively few passageways to ensure a favorable pressure drop from any passageway wall to a nearby conduit. A still further realization is that a conventional monolith with substantially uniformly spaced passageways can be readily converted into such a structure by selectively sealing existing passageways and establishing channels from those sealed passageways to a filtrate collection zone.

This invention features a cross-flow filtration device for receiving a feed stock at a feed end and for separating the feed stock into filtrate and retentate. There is a structure of porous material defining a number of passageways extending longitudinally from the feed end to a retentate end of the structure to pass retentate from the device, and a plurality of filtrate conduits within the structure for carrying filtrate from within the structure toward a filtrate collection zone. The filtrate conduits provide flow paths of lower flow resistance than that of alternative flow paths through the porous material, and the structure is constructed such that the filtrate conduits are distributed among the passageways to provide low pressure drop flow paths from the passageways through the porous material to nearby filtrate conduits.

In one embodiment, the structure is a single monolith and the filtrate conduits are formed within it. The filtrate conduits may extend longitudinally from the feed end to the retentate end of the structure. Alternatively, at least one of the filtrate conduits extends longitudinally with the passageways along at least a portion of its length. The filtrate conduit includes a channel extending transversely from the longitudinal portion to the filtrate collection zone for directing filtrate to the filtrate collection zone. The filtrate conduit may further include a plurality of longitudinal chambers which connect with the channel. The channel may be a slot at an end of the monolith or a hole formed in the monolith to connect the longitudinal portion of the filtrate conduit to the filtrate collection zone. At least one channel may be formed in the filtrate conduit at both the feed end and the retentate end of the device.

In another embodiment, the structure is constructed from a plurality of separate segments of the porous material, each segment having a plurality of the passageways extending along it, and the segments are arranged to define the filtrate conduits among them. The segments may be slabs of substantially rectangular cross section and may be generally parallel to each other.

In still another embodiment, the structure includes barrier means, disposed at the feed and retentate ends of the structure, for inhibiting direct passage of the feed stock and retentate into the filtrate conduits. The barrier means may include plugs of the same material as the structure, or other, and the plugs may have a porosity similar to or less than that of the structure material. The surface area of the passageways is from about 100 to 1,000 or 200 to 800 square feet per cubic foot of structure. The passageways may be generally parallel to each other, and the passageways may be arranged between the filtrate conduits in successive layers.

In yet another embodiment, the filtrate conduits are filled with a packing material having a lower flow resistance than that of the porous material to provide mechanical support for the filtrate conduits. Alternately, the filtrate conduits are hollow. The filtrate conduits may communicate directly with the filtrate collection zone, or, when the structure is a monolith having a skin, the filtrate conduits direct the filtrate through the skin. The outer skin may include a number of openings to enhance transport of the filtrate to the filtrate collection zone. The filtrate conduits may be substantially equally spaced and generally parallel to each other. The porous material may be a ceramic material selected from cordierite, aluina, mullite, silica, zirconia, titania, spinel, silicon carbide, or mixtures thereof. The porous material may have a porosity of about 20–60% and a mean pore size of about 0.1 to 20 microns. The cross-flow filtration device may further include a permselective membrane applied to the surfaces of the passageways and selected from the group of membranes suitable for cross-flow microfiltration, ultrafiltration, reverse osmosis, gas separations, or pervaporation.

This invention also features a method of forming filtrate conduits in a monolith of porous material having a plurality of passageways extending from an upstream and to a downstream end of the monolith, including selecting a number of the passageways as filtrate conduit passageways for carrying filtrate from within the monolith to a filtrate collection zone. The filtrate conduit passageways are distributed among the non-selected passageways to provide low pressure drop flow paths from the non-selected passageways through the porous material to nearby filtrate conduit passageways. The method further includes establishing one or more channels to connect the filtrate conduit passageways to the filtrate collection zone, and sealing the filtrate conduit passageways to inhibit direct passage of fluid into the filtrate conduit passageways and the filtrate collection zone.

In one embodiment, the filtrate conduit passageways are sealed at the upstream and downstream ends of the monolith, and establishing each channel includes cutting a slot in an end of the monolith to form that channel. Alternatively, a hole is formed into the monolith to form that channel.

In another embodiment, selecting includes designating a plurality of sets of passageways as filtrate conduit passageways, each set being a row of adjoining passageways. The sets of filtrate conduit passageways may be substantially equally spaced and parallel. Each set of filtrate conduit passageways and associated channels may extend across the monolith. The monolith may have substantially uniformly spaced and axially spaced parallel passageways and may be made from a ceramic material.

DISCLOSURE OF PREFERRED EMBODIMENT

Other objects, features and advantages will occur from the following description of a preferred embodiment and the accompanying drawings, in which.

This invention may be accomplished by a cross-flow filtration device formed of one or more multiple-passageway supports of porous material having a number of filtrate conduits distributed among and isolated from the monolith passageways. The resulting cross-flow filtration device receives a feed stock at a feed end and the walls of the passageways conduct the filtrate to the filtrate conduits while passing the impermeable materials as retentate from a retentate end. The filtrate conduits provide paths of lower flow resistance than that of alternative flow paths through the porous material and provide a direct route for the filtrate to travel from the interior of the cross-flow filtration device to a filtrate collection zone typically proximate the exterior of the cross-flow filtration device.

A filtration device according to this invention is described as a cross-flow filtration device from which filtrate and retentate are extracted, but it is to be recognized that the invention also relates to a porous material used as a support for a membrane device from which permeate and retentate are extracted. Hereinafter, the term cross-flow filtration device encompasses a porous support structure for a membrane device and the term filtrate encompasses permeate extracted from a membrane device. Such membranes can include separation barriers suitable for cross-flow microfiltration, ultrafiltration, reverse osmosis, gas separations, and pervaporation.

In one construction, the cross-flow filtration device employs a single monolith having filtrate conduits formed within it. Alternatively, the cross-flow filtration device is assembled from a number of separate monolith segments such as slabs. Each slab contains a number of passageways, and the slabs are arranged to define filtrate conduits among them. In either construction, each filtrate conduit is supplied with filtrate from a relatively large number of passageways proximate to it, and which lie along its boundary as it extends toward the filtrate collection zone of the cross-flow filtration device. Further, each filtrate conduit is separated from neighboring filtrate conduits by a relatively small number of passageways. This insures an adequately low pressure drop for filtrate flow from any passageway wall through intervening walls to a filtrate conduit.

This invention may also be accomplished by converting a conventional monolith having a number of passageways, typically substantially uniformly spaced, by sealing some of the passageways at each end and establishing channels from the sealed passageways to a filtrate collection zone. The modified passageways thus serve as filtrate conduits according to this invention.

Figure 1:
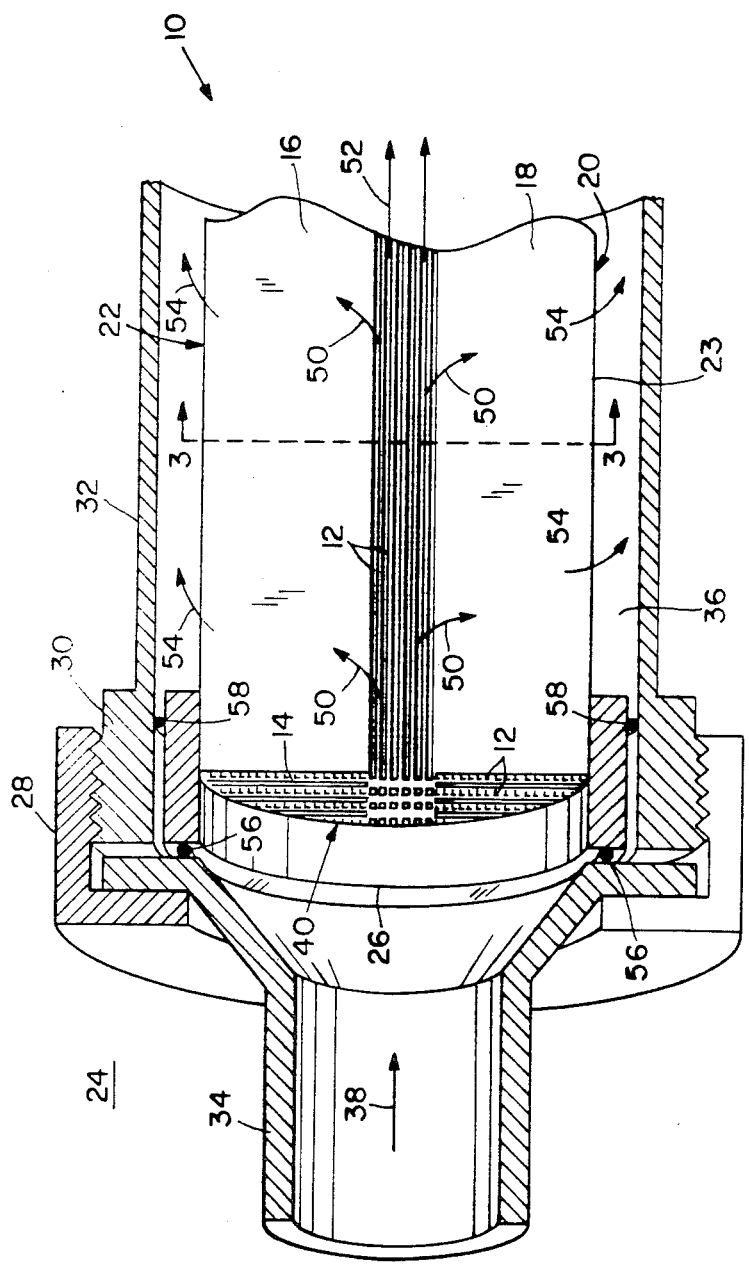
FIG. 1 is a schematic partial axonometric cutaway view of a cross-flow filtration device according to this invention and disposed in a cross-flow filtration apparatus.

Cross-flow filtration device 10, FIG. 1, is a cylindrical monolith and includes passageways 12 and filtrate conduits 14. The latter may be formed in the monolith, for example, at the time of manufacture by extrusion or other means. The cutaway view of FIG. 1 is through upper filtrate conduit 16 and lower filtrate conduit 18, revealing passageways 12 only at the center of device 10. A cross-section taken slightly to either side of filtrate conduits 16, 18 would reveal additional passageways aligned in parallel and lying adjacent to each other from lower portion 20 to upper portion 22 of membrane device 10.

Cross-flow filtration device 10 according to this invention is part of cross-flow filtration apparatus 24. Cylindrical ring end fitting 26 is bonded with cement to outer monolith skin 23 of cylindrical cross-flow filtration device 10. Threaded end cap 28 engages matching threaded portion 30 of housing 32 and forcibly seals end fitting 26 against feed connecting pipe 34 with an O-ring seal 56. A second O-ring seal 58 is provided between cylindrical ring 26 and threaded portion 30 of housing 32. An alternate sealing procedure utilizes the end faces of outer skin 23 of cylindrical cross-flow filtration device 10 to seal to feed connecting pipe 34 through O-ring seal 56 and to threaded portion 30 of housing 32 through O-ring seal 58. Filtrate collection annulus 36 lies between skin 23 and housing 32.

Figure 2:
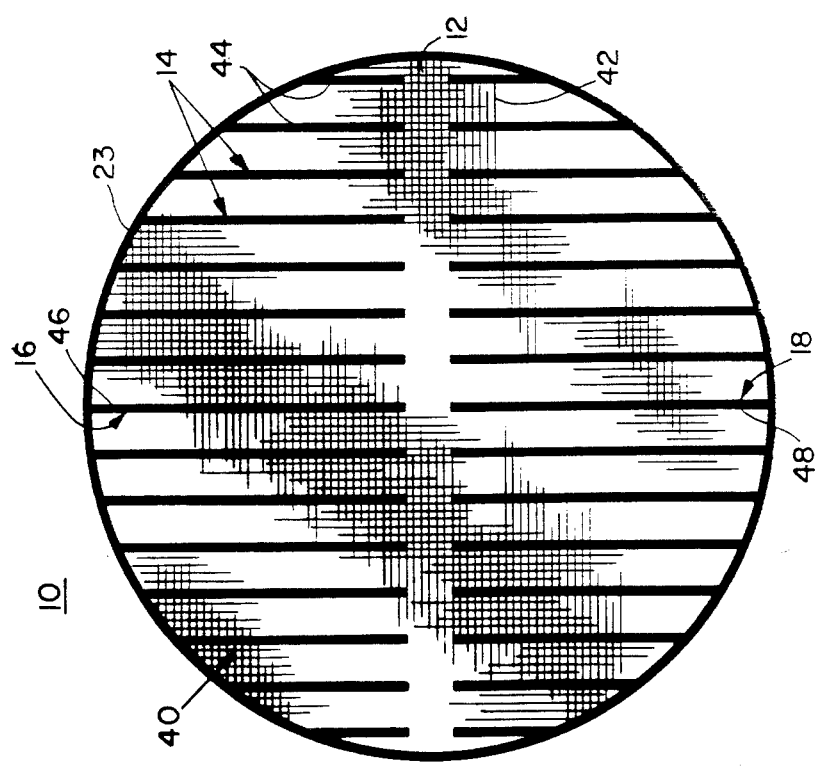
FIG. 2 is an end view of the cross-flow filtration device shown in FIG. 1.

In operation feed stock is forced under pressure in the direction indicated by arrow 38. Feed end 40 of cross-flow filtration device 10 receives the feed stock and passes the fluid longitudinally until it exits from the retentate end (not shown). Feed end 40 is shown in an enlarged, end view in FIG. 2 to reveal square openings of passageways 12, each defined and surrounded by passageway walls 42. Also shown are end plugs 44 such as plugs 46, 48, for filtrate conduits 16, 18. Plugs 44 at feed and retentate ends of the monolith isolate filtrate conduits 14 from direct contact with the feed stock or retentate. Along the interior of cross-flow filtration device 10, walls 42 of passageways 12 allow only the filtrate to enter filtrate conduits 14. Plugs 44 can be of the same or a different material as walls 42 and are easily applied after masking the openings of passageways 12. The plugs are hardened by curing or firing, depending on composition, to provide a positive barrier between the feed stock and retentate, and the filtrate within filtrate conduits 14. If plugs 44 are porous it is desirable that the pores in plugs 44 not be larger than those of walls 42. The mechanical strength and chemical and thermal resistance of plugs 44 are selected according to the nature of the feed stock and intended operating pressure and temperature.

After entering feed end 40, FIG. 1, the fluid travels along passageways 12. The filtrate is gradually removed as indicated by arrows 50 and the impermeable retentate continues its passage as indicated by arrows 52. Once the filtrate reaches filtrate conduits 16, 18, it readily travels to and through skin 23 as depicted by arrows 54.

Figure 3:
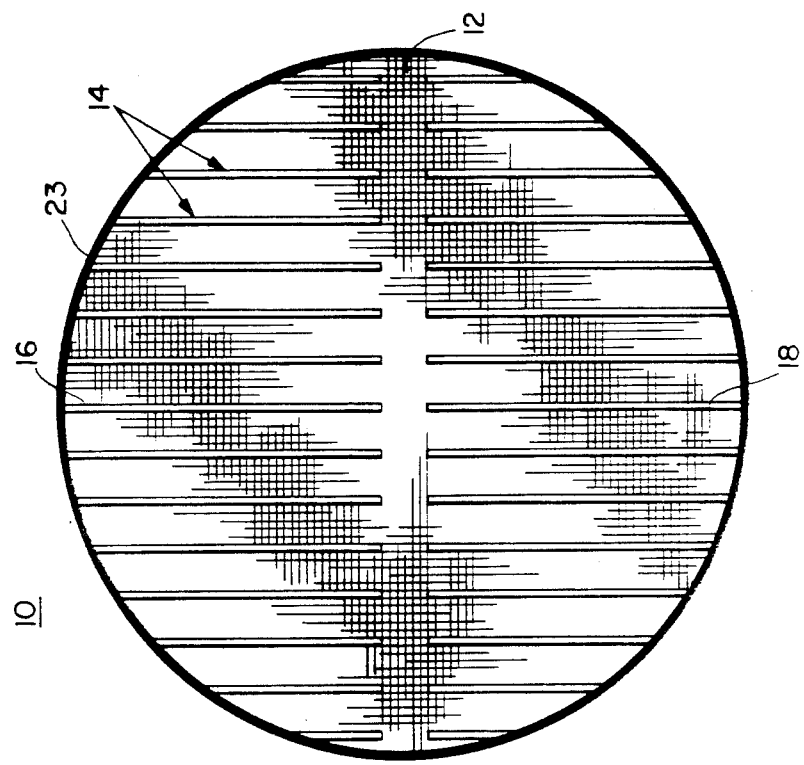
FIG. 3 is a cross-sectional view of the cross-flow filtration device along lines 3—3 of FIG. 1.
Figure 4B:
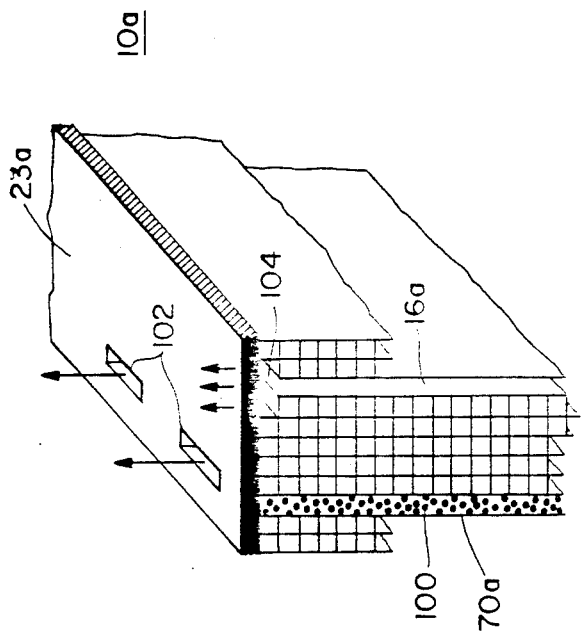
FIG. 4B is a schematic partial axonometric view of alternative constructions of the filtrate conduits showing their relation to the outer skin of the cross-flow filtration device.
Figure 4A:
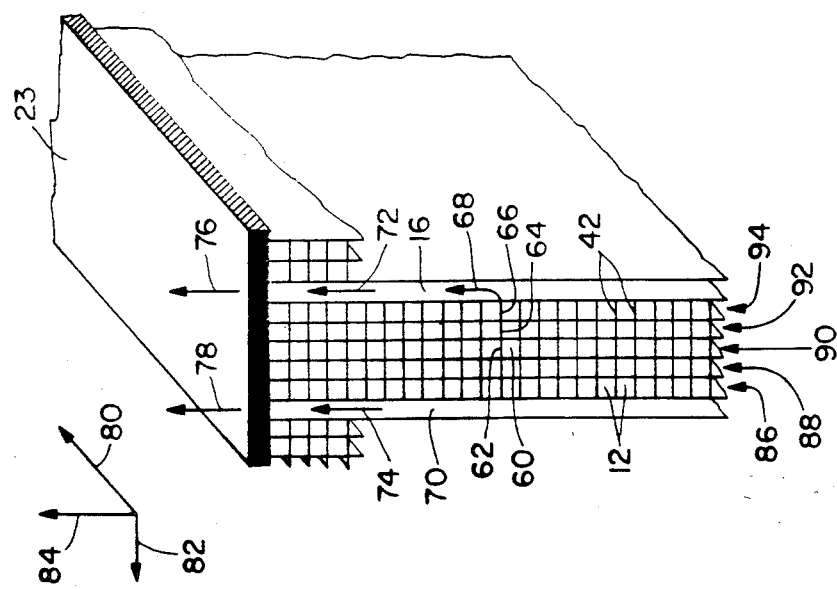
FIG. 4A is an enlarged view of a portion of the cross-flow filtration device of FIG. 3 showing two filtrate conduits according to this invention servicing a number of passageways.

Cross-flow filtration device 10 is shown in cross-section in FIG. 3 to reveal hollow filtrate conduits 14, e.g., conduits 16, 18, which are bounded by passageways 12. An enlarged portion of cross-flow filtration device 10 is shown in FIG. 4A to further illustrate the servicing of passageways 12 by filtrate conduits 14. Filtrate from passageway 60, for example, enters wall 62, travels through walls 64, 66, and emerges into filtrate conduit 16 as shown by arrow 68. Similarly, filtrate travels through intervening walls to enter filtrate conduit 70. Driven by a pressure differential, filtrate travels outwardly as indicated by arrows 72, 74, and passes through skin 23 as shown by arrows 76, 78.

The directions of fluid travel are represented by arrows 80, 82 and 84. Feed stock and retentate travel longitudinally through cross-flow filtration device 10 as shown by arrow 80. Filtrate enters the walls of the passageways and travels generally along a second dimension indicated by arrow 82. Once in the filtrate conduits, the filtrate travels outwardly in a third dimension, arrow 84, which is generally normal to the other two dimensions. Filtrate conduits 16, 70 are separated by a relatively small number of passageways along the second dimension, while each filtrate conduit is supplied with filtrate from a relatively large number of passageways adjacent to the filtrate conduits along the third dimension. In this construction, the passageways are arranged between the filtrate conduits in successive layers 86, 88, 90, 92, and 94.

Cross-flow filtration device 10, including walls 42, can be fabricated from a variety of porous materials, such as ceramics, plastics, or resin-impregnated solids such as sand. Among ceramics, it is desirable to use cordierite, alumina, mullite, silica, zirconia, titania, silicon carbide, spinel, or mixtures thereof. Acceptable porosities of the material range from 20 to 60 percent, preferably greater than 30 percent. The mean pore size, while selectable over a wide range, is typically in the range of about 0.1 to 20 microns.

Selection of the parameters of a cross-flow filtration device according to this invention is assisted by the Kozeny-Carmen adaptation of Darcy's law:

$$Q/A = \frac{\epsilon^3 \Delta P}{k' L \mu (1 - \epsilon)^2 S^2} \quad (1)$$

where Q/A is the rate of mass flow through the porous medium, that is, volume flow per unit time per unit cross-sectional area; is the porosity; P is the pressure drop; k') is the Kozeny-Carmen constant (nominally having a value of 5); L is the flow length; $\mu$ is the fluid viscosity; and S is the surface area of the porous medium. Application of the Kozeny-Carmen equation is described, for example, in Dullien, F. A. L., "Single Phase Flow through Porous Media and Porous Structure," in the Chemical Engineering Journal (Lausanne), 10, 1–34 (1975).

The surface area S is related to the pore hydraulic diameter $D_H$ by the following relationship:

$$D_H = \frac{4\epsilon}{(1 - \epsilon)S} \quad (2)$$

For a given material, therefore, the rate of mass flow Q/A is related to pore size and other factors as follows:

$$Q/A = \frac{\epsilon D_H^2 \Delta P}{16 k' \mu L} \quad (3)$$

The mean pore size is therefore very important in determining permeability of the passageway walls. While it would appear desirable to use the largest pored materials available, this is not necessarily possible. For cross-flow filtration the pore size determines separation effectiveness, and large pored materials may lack adequate separation efficiency. For use of monoliths as membrane supports, large pores may also be impractical. For example, Trulson and Litz in U.S. Pat. No. 3,977,967 disclose that for inorganic membranes formed dynamically on microporous supports, when supports with pores larger than 2 microns are used, fines in the particle suspensions used to form membranes can enter the support pore structure and plug the pores, resulting in undesirably low permeation rates. In contrast, the dynamic membrane formation procedures of Hoover and Roberts in U.S. Pat. No. 4,069,157 allow for a preferred pore size of 10 to 17 microns. Also, when inorganic membranes are formed by slip casting, larger pored supports may be used, as demonstrated by Alari et al., in U.S. Pat. No. 4,562,021. Thus for monoliths used as membrane supports, the maximum pore size that can be used must be related to the technique employed for membrane formation. But, in general, it has been demonstrated that membranes are more readily formed on finer pored materials.

The construction of a cross-flow filtration device according to this invention, including its configuration and the fabrication material, depends on the intended use of the cross-flow filtration device. Considering the construction of cross-flow filtration device 10, its filtrate flow characteristics can be calculated by examining the section illustrated in FIG. 4A. The thin-walled structure drains filtrate into two parallel filtrate conduits 16, 70. For the purpose of this calculation it is assumed that the section has a uniformly distributed water filtrate flow into the monolith passageway walls of 1000 gallons per day per square foot geometric area (gfd). If the device is used for cross flow filtration, this would be a typical and desirable filtration rate for many process applications. If the monolith device is to be used as a membrane support, the same filtrate flow level will be suitable for ultrafiltration and reverse osmosis devices, with resulting membrane device water fluxes of about 100 gfd or greater. These membrane water flux levels are suitable for most process applications.

Given the assumption of a uniformly-distributed water filtrate flow of 1000 gfd, the pressure drop through the monolith passageway walls can be estimated. In the following sample calculation the parameters of the monolith are as follows: the porosity of the support material is 45%; the passageway density is 300 square passageways per square inch with a passageway size of 0.044 inch; the wall thickness is 0.012 inch; and the passageway surface area is 53 square inches per cubic inch. Using Equation (3) with a value of a Kozeny-Carmen constant of 5, the pressure drop from the center of the structure to the filtrate conduits for different numbers n of passageways between the filtrate conduits and for different values of mean pore diameter $D_H$ is shown in Table 1. The pressure drop is expressed as pounds per square inch (psi).

TABLE 1

| | PRESSURE DROP, IN PSI | | |
|---|---|---|---|
| n | $D_H = 4\mu$ | $D_H = 2\mu$ | $D_H = 1\mu$ |
| 5 | 44 | 175 | 698 |
| 10 | 183 | 734 | 2932 |
| 20 | 743 | 2970 | 11880 |

These calculations illustrate the dramatic increase in pressure drop from interior passageways to a filtrate conduit as the number of passageways between conduits increases or pore size decreases. The pressure drop increases with the square of the number of passageways because both the filtrate flow (Q/A) and flow path length (L) increase in proportion to the number of passageways.

Similar calculations can be made for monoliths of different passageway dimensions, and the results of Table 2 illustrate such an analysis.

TABLE 2

| | | PRESSURE DROP TO FILTRATE CONDUITS, PSI | | | |
|---|---|---|---|---|---|
| PASSAGEWAYS PER SQ. IN. | PASSAGEWAY AREA SQ. IN./CU. IN. | PASSAGEWAY SIZE, IN. | PASSAGEWAY WALL, IN. | LENGTH BETWEEN CONDUITS, IN. | PRESSURE DROP PSI |
| 300 | 53 | 0.044 | 0.012 | 0.27 | 44 |
| 200 | 46 | 0.058 | 0.012 | 0.34 | 75 |
| 100 | 33 | 0.083 | 0.017 | 0.48 | 110 |
| 50 | 23 | 0.115 | 0.025 | 0.68 | 140 |

These calculations are based on the dimensional properties of commercially available monoliths (without filtrate conduits) with square passageways, a porosity of 45%, a pore size of 4 microns, and five passageways between conduits. For this family of monolith materials the pressure drop from the center of the structure increases approximately in proportion to the distance between conduits. This reflects the interaction among the variables of Equation (3). Thus for this family of materials the critical parameter is the distance between filtrate conduits. Note that, from Table 1, for a fixed passageway size monolith the critical parameter is the square of the distance between conduits.

The construction selected for a device according to this invention also depends on the pressure under which the device operates. For ultrafiltration devices, for example, device operation typically occurs at 50 to 100 psig. For the monolith materials of Table 1 a preferred monolith substrate would have a 4-micron or larger pore size and five or fewer passageways between filtrate conduits. For reverse osmosis devices, system operation typically occurs at 500 to 1000 psig, and a finer pore size material or a greater number of passageways between filtrate conduits may be used.

Variations from these values would be required for different porosities, different fluids, different values of the Kozeny-Carmen constant (which is material dependent), and other variables. Also, the above calculations are based on the assumption of a uniformly distributed filtrate flow into passageway walls of 1000 gfd. This assumption is generally valid for devices which have a membrane applied to the passageway walls, for example, by solution casting or slip casting, and the membrane provides the major resistance to filtrate removal. For cross-flow filtration or dynamic membrane formation the assumption of uniform filtrate flow may not be valid. In these instances filtrate flow through the porous material will be very high adjacent to filtrate conduits and will diminish rapidly as the distance from the filtrate conduits increases. In this case the spacing of filtrate conduits may need to be even smaller in order to obtain adequate filtrate flow through the passageway walls distant from the filtrate conduits. Alternatively, it may be necessary to use porous materials with greater pore size and porosity or thicker passageway walls. Based on these considerations different requirements may exist for porous materials used as supports for membranes, applied other than by dynamic formation, and for porous materials used as cross-flow filters or as supports for dynamically-formed membranes. But these typical results illustrate the limitation associated with the use of monoliths without filtrate conduits and the beneficial result of incorporation of such conduits. The presence of filtrate conduits as detailed herein results in the beneficial use of porous monoliths with passageway surface area in the range of 100 to 1000 square feet per cubic foot, and preferably between 200 and 800 square feet per cubic foot.

Once the filtrate has reached a hollow filtrate conduit, the pressure drop within the conduit to the outer skin of the device must be considered. For the structure described above, a convenient conduit spacing is that of the dimensions of a single passageway, i.e., 0.044 in. Conduit length, i.e., from the monolith center to the monolith skin, is typically 1 to 4 in. The relationship for pressure drop in laminar flow, $P_{LF}$, inside parallel plates is given by:

$$\Delta P_{LF} = \frac{12\mu V x}{g_c h^2} \quad (4)$$

where: V is the fluid velocity; x is the channel length; h is the channel width; $\mu$ is fluid viscosity; and $g_c$ is the gravitational constant. For filtrate flow corresponding to a uniformly distributed water permeability of 1000 gfd, the pressure drop in the filtrate conduits is insignificant, that is less than 0.01 psi for conduit lengths up to several inches. It is therefore desirable to have the thickness of the filtrate conduits as small as possible to render the total conduit volume small relative to the total passageway volume, which increases the effective surface area of the device per unit volume. High filtration rates for cross-flow filtration devices with high filter areas per unit volume are thereby achieved.

If increased mechanical support for passageway walls adjacent to filtrate conduits is desired, the conduits can be filled with a granular material in a manner which still establishes filtrate conduits which have a lower flow resistance than that of the passageway walls. For example, granular material 100, FIG. 4B is shown within filtrate conduit 70a, for cross-flow filtration device 10a. During construction of device 10a, granular material 100 can be added through one of the ends of filtrate conduit 70a as a packing before conduit 70a is plugged. Granular material 100 may include a binder to solidify it as a porous matrix. The increased mechanical support provided by coarse granular material 100 may be desirable especially when there is a high pressure differential across the passageway walls adjacent to filtrate conduit 70a.

There may also be a significant pressure differential across monolith skin 23a between filtrate conduits 70a, 16a, and the surrounding filtrate collection zone. Increased mechanical strength of skin 23a is achieved by increasing its thickness. However, the resistance of skin 23a to filtrate removal must also be considered, such as by applying Equation (3). When desired, the filtrate flow resistance of skin 23a can be reduced by providing perforations such as slits 102 so that filtrate conduit 70a communicates directly with the filtrate collection zone. One or more perforations per filtrate conduit can be established. Alternatively, the area of the filtrate conduits can be enlarged next to skin 23a such as shown by chamber 104 of filtrate conduit 16a. Chamber 104 provides a larger cross-sectional area for filtrate flow through skin 23a.

Figure 5:
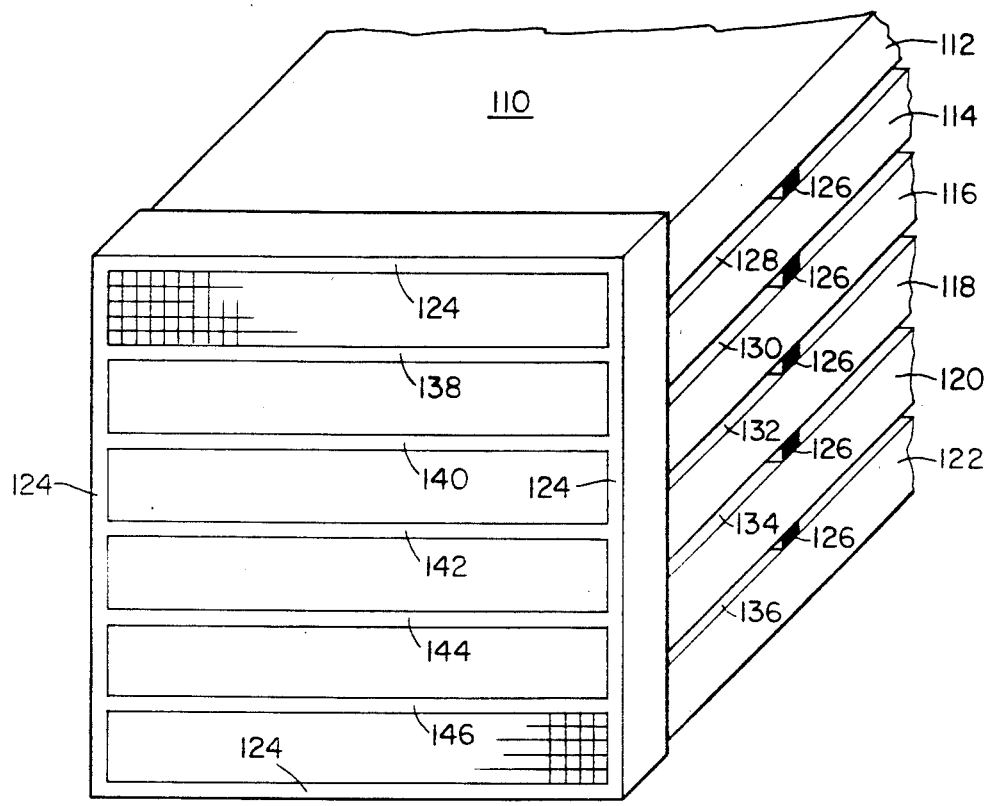
FIG. 5 is an alternate cross-flow filtration device according to this invention having a number of monolith slabs assembled to define filtrate conduits among them.

Cross-flow filtration device 110, FIG. 5, is an alternative construction of a device according to this invention. Monolith slabs 112, 114, 116, 118, 120 and 122 are assembled as a single structure in retaining device 124 which with its cross members 138, 140, 142, 144, 146 forms a tube sheet. The spaces between the monolith slabs and the retaining device 124 and its cross members 138, 140, 142, 144, 146 are sealed with a sealant or alternatively with mechanical seals such as O-rings. Additional positioning and mechanical support of slabs 112-122 can be provided by supports 126 distributed among them. Monolith slabs 112-122 define among them filtrate conduits 128, 130, 132, 134 and 136 which feed filtrate directly into a surrounding filtrate collection zone (not shown). The end faces of retaining device 124 serve as sealing surfaces when assembled in a cross-flow filtration apparatus similar to the one shown in FIG. 1.

Cross-flow filtration device 110 enables use of monolith slabs having a very high packing density of passageways. Each slab 112-122 is sufficiently thin so that filtrate flows from the walls of the passageways to the nearest filtrate conduit with an acceptably low pressure drop. Slabs 112-122 are spaced from each other such that the so defined filtrate conduits provide a low pressure drop flow path for filtrate removal to a filtrate collection zone.

Figure 6:
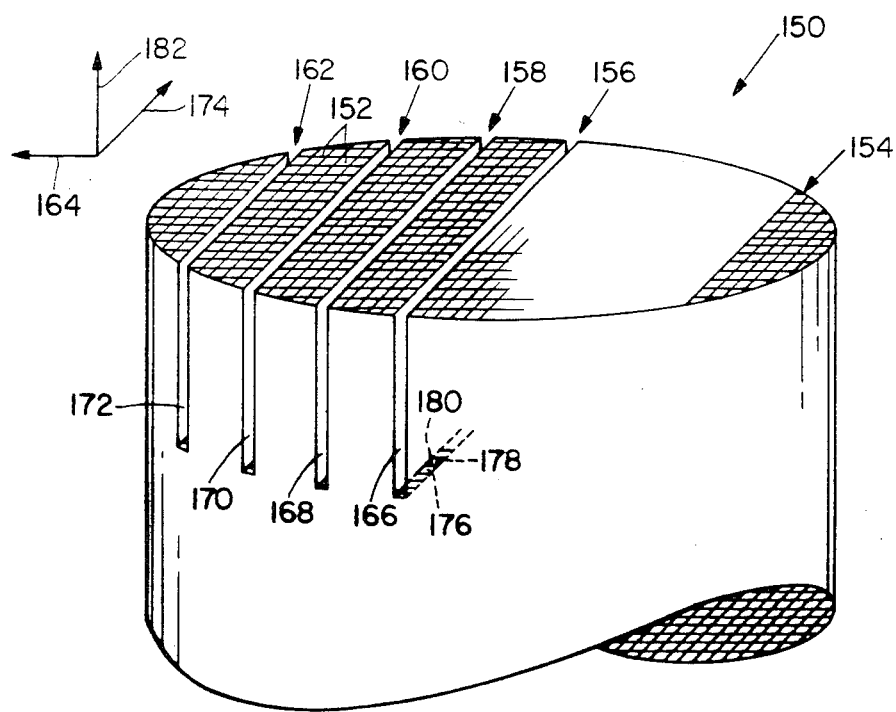
FIG. 6 is a schematic partial axonometric end view of a cross-flow filtration device according to this invention being formed from a conventional monolith manufactured with substantially equally spaced passageways.

A cross-flow filtration device according to this invention can also be constructed from a conventional monolith such as monolith 150, FIG. 6, having substantially equally spaced passageways 152. Conventional monolith 150 is converted as follows. Rows of passageways 152 are selected at intervals, e.g. every fifth or sixth row, as filtrate conduit passageways. Designated rows, such as rows 156, 158, 160 and 162 are selected along a first dimension 164. Row 154 represents a filtrate conduit row which has not yet been modified according to this invention. As shown, rows 156, 158, 160, 162 are substantially equally spaced in a first dimension 164 and are generally parallel to each other. These rows are shown having slots 166, 168, 170, and 172, respectively, cut into monolith 150. Slots 166, 168, 170, 172 serve as channels to connect the unaltered, longitudinal portions of the filtrate conduit passageways in the respective rows to a filtrate collection zone. Each row of filtrate conduit passageways operates as a filtrate conduit, and each passageway is a chamber of the filtrate conduit connected with a channel and separated from adjoining passageways in second dimension 174 by a single wall of the monolith material. For example, filtrate conduit passageways 176, 178 are separated by wall 180 and are both connected with slot 166.

Once a slot is cut for each filtrate conduit row of passageways, each row is plugged at the feed and retentate ends of the monolith along dimension 174. Completed cross-flow filtration device 184, FIG. 7, has plugs 186 at the retentate end for each slot 188, and matching plugs 190 at the feed end for each filtrate conduit row.

For use as a cross-flow filtration device, the modified monolith 150 is placed in an apparatus similar to apparatus 24, FIG. 1. Feed flow, represented by arrow 192, enters the feed end of cross-flow filtration device 184. Filtrate passes through the walls of passageways 152 to enter the filtrate conduit passageways serving as filtrate conduits. Filtrate travels as shown by arrows 194, coinciding with dimension 182, until slots 188 are reached, at which point the filtrate flows along dimension 174, indicated by arrow 196.

Figure 8:
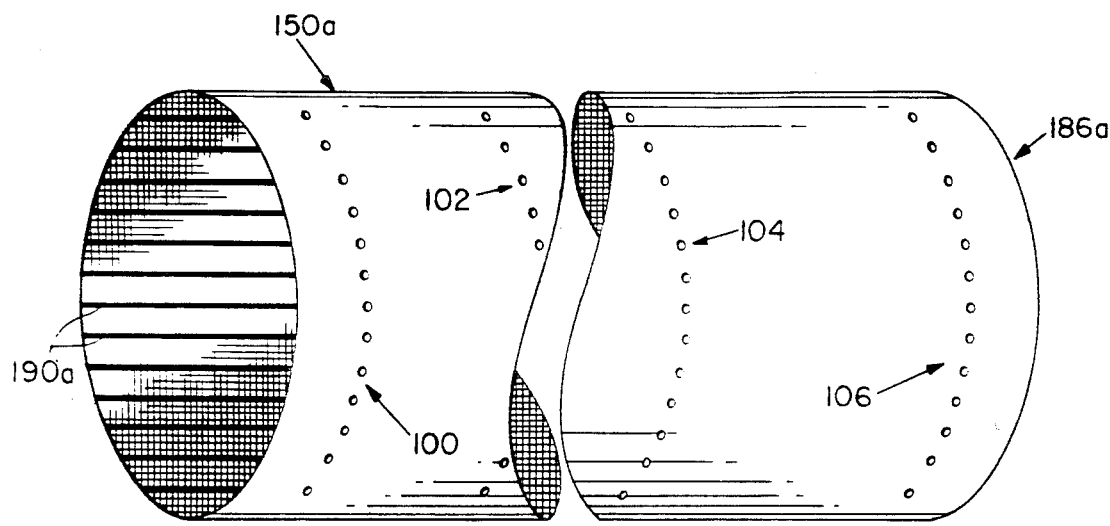
FIG. 8 is a schematic axonometric view of yet another cross-flow filtration device according to this invention formed from a conventional monolith.

In alternative cross-flow filtration device 184a, FIG. 8, each filtrate conduit row has four sets of channels established by drilled holes 100, 102, 104, 106 which pass through the monolith 150a intersecting each filtrate conduit row. In another construction, only one set of holes is provided mid-way between the feed and retentate ends. Plugs 190a, 186a at the ends of monolith 150a prevent direct passage of feed or retentate fluid into the filtrate conduit passageways.

Providing channels at both ends of monolith device 150 or 150a for each filtrate conduit row is especially desirable for separations involving filtrate reflux, such as in certain gas separations.

Further, if required, the filtrate conduit passageways and the channels may be filled with a highly porous material to increase the mechanical support of passageway walls adjacent to filtrate conduit passageways and channels.

The following examples provide a comparison of monolith permeability for a conventional monolith and a monolith modified to have filtrate conduit passageways and channels according to this invention:

EXAMPLE 1

A conventional monolith was assembled in an apparatus similar to that of FIG. 1. Cylindrical ceramic end rings 56 were bonded to the monolith ends using a silicone adhesive. The monolith, obtained from Corning Glass Works, Corning, New York, was a right cylinder four inches in diameter and six inches long. The passageway configuration was square with 300 cells per square inch, uniformly spaced. The passageway dimension was 0.044 inch and the passageway wall thickness was 0.012 inch. The total passageway area through which filtrate could flow was about 28 square feet, less the area of a few passageways adjacent to the monolith outer skin which were plugged by adhesive. The monolith material was cordierite EX-20 with a mean pore size of 3 to 4 microns and a porosity of 33 percent. After installation of the monolith in the apparatus of FIG. 1 the average water permeability, based on an estimated area of 26 square feet, was measured to be 110 gfd at 40° F. and a feed water pressure of 50 psig.

EXAMPLE 2

Figure 7:
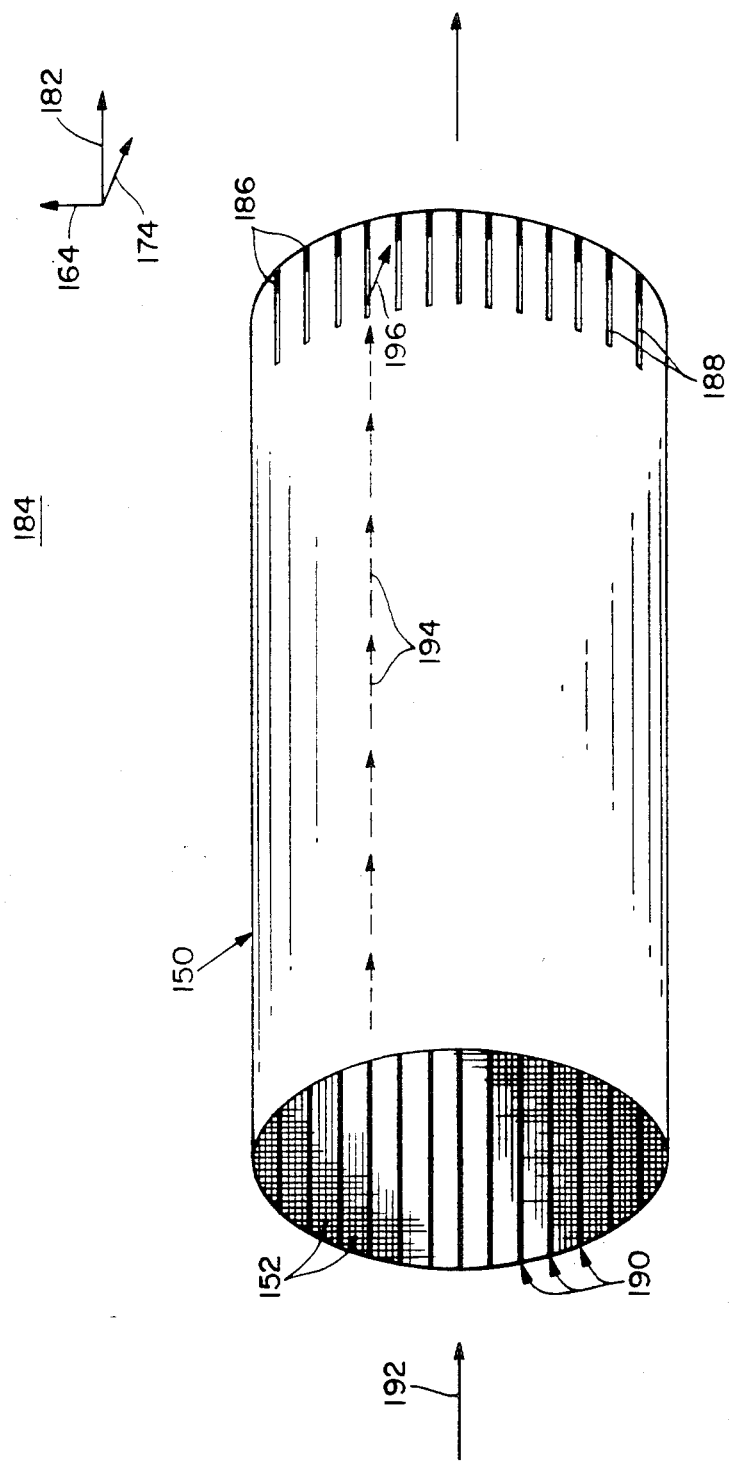
FIG. 7 is an axonometric view of the cross-flow filtration device of of FIG. 6 after completion.

A second monolith of the same material and passageway configuration was modified according to this invention to have filtrate conduits as shown in FIGS. 6 and 7. The conduits were spaced every fifth row of passageways and plugged at the monolith ends with silicone adhesive. Slots were formed at one end of the monolith, and each slot had an opening length at the side of the monolith into the filtrate collection zone of approximately 0.5 inch. The total passageway area available for filtrate flow was about 20 square feet, allowing for a reduction in area from that of the original monolith of 20 percent for filtrate conduits and a lesser amount for passageways adjacent to the monolith skin which had been plugged by adhesive. The monolith was inserted into the apparatus used in example 1 and its water permeability was measured to be about 2400 gfd at 40° F. and a feed water pressure of 50 psig.

The monolith of Example 2 experienced an increase in monolith permeability of 22-fold over the conventional monolith of Example 1, even though the second monolith exhibited a reduction in passageway area of only about 20 percent. Subsequent cross-flow microfiltration tests of the monolith of Example 2 with a highly turbid suspension of colloidal zirconia showed a filtrate completely free of turbidity. This demonstrated that the measured high permeability was not due to any leak or bypassing in the module but resulted from the operation of the filtrate conduits according to this invention.

While a square array of square passageways is used for the above examples, it is to be recognized that other passageway shapes, such as round or triangular, and other arrays, such as hexagonally spaced, may be employed. Further, in the above examples essentially parallel filtrate conduits are described, but it is to be recognized that alternative conduit configurations, such as ones aligned on the radii of a cylindrical monolith, may be employed.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A cross-flow filtration device for receiving a feed stock at a feed end and for separating the feed stock into filtrate and retentate, comprising:
   a structure of porous material defining a plurality of passageways extending longitudinally from the feed end to a retentate end of the structure through which the feed stock flows to pass retentate from the device, the surface area of the passageways being at least 100 square feet per cubic foot of the structure;
   a filtrate collection zone disposed along at least one side of the structure;
   a plurality of filtrate conduits within the structure for carrying filtrate from within the structure toward the filtrate collection zone, the filtrate conduits providing paths of lower flow resistance than that of alternative flow paths through the porous material;
   the filtrate conduits being distributed among the passageways to provide low pressure drop flow paths for filtrate flow through the porous material from the passageways to nearby filtrate conduits; and
   means for isolating the filtrate collection zone from the feed and retentate ends of the structure.

2. The cross-flow filtration device of claim 1 in which the structure is a single monolith and the filtrate conduits are formed within it.

3. The cross-flow filtration device of claim 2 in which the filtrate conduits extend longitudinally from the feed end to the retentate end of the structure.

4. The cross-flow filtration device of claim 2 in which the monolith has a skin through which the filtrate conduits direct the filtrate to the filtrate collection zone.

5. The cross-flow filtration device of claim 4 in which the monolith skin includes a plurality of openings to enhance transport of the filtrate from the filtrate conduits to the filtrate collection zone.

6. The cross-flow filtration device of claim 2 in which at least one of the filtrate conduits extends longitudinally together with the passageways along at least a portion of its length.

7. The cross-flow filtration device of claim 6 in which the filtrate conduit includes at least one channel extending transversely from the longitudinal portion to the filtrate collection zone for directing filtrate to the filtrate collection zone.

8. The cross-flow filtration device of claim 7 in which the longitudinal portion includes a plurality of longitudinal chambers which connect with the channel.

9. The cross-flow filtration device of claim 7 in which the channel is a slot formed in one end of the monolith.

10. The cross-flow filtration device of claim 7 in which the channel is a hole formed in the monolith.

11. The cross-flow filtration device of claim 7 in which the filtrate conduit includes at least one channel formed at both the feed end and the retentate end of the device.

12. The cross-flow filtration device of claim 1 in which the structure is constructed from a plurality of separate segments of the porous material, each segment having a plurality of the passageways extending along it, and the segments are arranged to define the filtrate conduits among them.

13. The cross-flow filtration device of claim 12 in which the segments are slabs of substantially rectangular cross section and are generally parallel to each other.

14. The cross-flow filtration device of claim 1 in which the structure includes barrier means, disposed at the feed and retentate ends of the structure, for inhibiting direct passage of the feed stock and retentate into the filtrate conduits.

15. The cross-flow filtration device of claim 1 in which the surface area of the passageways is from about 200 to 800 square feet per cubic foot of the structure.

16. The cross-flow filtration device of claim 1 in which the passageways are generally parallel.

17. The cross-flow filtration device of claim 16 in which the passageways are arranged between the filtrate conduits in successive layers.

18. The cross-flow filtration device of claim 1 in which the filtrate conduits are filled with a packing material having a lower flow resistance than that of the porous material to provide mechanical support for the filtrate conduits.

19. The cross-flow filtration device of claim 1 in which the filtrate conduits are substantially equally spaced and generally parallel.

20. The cross-flow filtration device of claim 1 in which the porous structure material is a ceramic material.

21. The cross-flow filtration device of claim 20 in which the ceramic material is selected from cordierite, alumina, mullite, silica, zirconia, titania, spinel, silicon carbide, or mixtures thereof.

22. The cross-flow filtration device of claim 1 in which the porous material has a porosity of about 20 to 60 percent.

23. The cross-flow filtration device of claim 1 in which the porous material has a mean pore size of about 0.1 to 20 microns.

24. The cross-flow filtration device of claim 1 further including a permselective membrane applied to the surfaces of the passageways.

25. The cross-flow filtration device of claim 24 in which the permselective membrane is selected from the group of membranes suitable for cross-flow microfiltration, ultrafiltration, reverse osmosis, gas separations, or pervaporation.

26. The cross-flow filtration device of claim 1 in which the filtrate conduits in combination with the structure provide a mean permeability of at least 1000 gallons per day per square foot passageway surface area for water at 25 degrees Centigrade supplied to the passageways at a pressure differential between the passageways and the filtrate collection zone substantially similar to that selected for the feed stock.

27. The cross-flow filtration device of claim 1 in which the filtrate collection zone surrounds all sides of the structure.

28. A method of forming filtrate conduits in a monolith of porous material having a plurality of passageways extending from an upstream end to a downstream end of the monolith, comprising:
selecting one or more of the passageways as filtrate conduit passageways for carrying filtrate from within the monolith to a filtrate collection zone, disposed along at least one side of the monolith, to distribute the filtrate conduit passageways among the non-selected passageways to provide low pressure drop flow paths from the non-selected passageways through the porous material to nearby filtrate conduit passageways, the surface area of the passageways being at least 100 square feet per cubic foot of the structure;
establishing one or more channels to connect the filtrate conduit passageways to the filtrate collection zone; and
sealing the filtrate conduit passageways to inhibit direct passage of fluid into the filtrate conduit passageways and the filtrate collection zone.

29. The method of claim 28 in which the filtrate conduit passageways are sealed at the upstream and downstream ends of the monolith.

30. The method of claim 28 in which establishing each channel includes cutting a slot in at least one end of the monolith to form that channel.

31. The method of claim 28 in which establishing each channel includes forming a hole through the monolith to form that channel.

32. The method of claim 28 in which selecting includes designating a plurality of sets of passageways as filtrate conduit passageways, each set including a row of adjoining passageways.

33. The method of claim 32 in which the sets of filtrate conduit passageways are substantially equally spaced and parallel.

34. The method of claim 32 in which each set of filtrate conduit passageways and associated channel extends across the monolith.

35. The method of claim 28 in which selecting includes providing a surface area of non-selected passageways of at least 100 square feet per cubic foot of the monolith.

36. The method of claim 35 further including providing the monolith with a mean permeability of at least 1000 gallons per day per square foot geometric area for water at 25 degrees Centigrade supplied to the passageways at a pressure differential between the passageways and the filtrate collection zone substantially similar to that selected for the feed stock.

37. A cross-flow filtration device for receiving a feed stock at a feed end and for separating the feed stock into filtrate and retentate, comprising:
a single monolith of porous material defining a plurality of passageways extending longitudinally from the feed end to a retentate end of the monolith through which the feed stock flows to pass retentate from the device;
a filtrate collection zone disposed along at least one side of the monolith;
a plurality of filtrate conduits formed within the monolith for carrying filtrate from within the monolith toward the filtrate collection zone, the filtrate conduits providing flow paths of lower flow resistance than that of alternative flow paths through the porous material;
the filtrate conduits being distributed among the passageways to provide low pressure drop flow paths for filtrate flow through the porous material from the passageways to nearby filtrate conduits;
the surface area of the passageways being at least 100 square feet per cubic foot of the monolith; and
means for isolating the filtrate collection zone from the feed and retentate ends of the monolith.

* * * * *